(12) United States Patent
Murakami

(10) Patent No.: US 7,742,096 B2
(45) Date of Patent: Jun. 22, 2010

(54) IMAGE PICKUP APPARATUS INCLUDING A LENS BARREL OPENING AND CLOSING A LENS BARRIER PROTECTING A LENS AND CONTROL METHOD THEREFOR, AND CONTROL PROGRAM FOR IMPLEMENTING THE CONTROL METHOD

(75) Inventor: Taro Murakami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 823 days.

(21) Appl. No.: 10/935,285

(22) Filed: Sep. 8, 2004

(65) Prior Publication Data

US 2005/0052560 A1    Mar. 10, 2005

(30) Foreign Application Priority Data

Sep. 10, 2003    (JP) .............................. 2003-318913

(51) Int. Cl.
H04N 5/225    (2006.01)

(52) U.S. Cl. ....................................... 348/335; 348/345

(58) Field of Classification Search ................ 348/335, 348/373, 345; 396/72, 87, 86; 359/826
See application file for complete search history.

(56) References Cited

U.S. PATENT DOCUMENTS

| | | | | |
|---|---|---|---|---|
| 5,257,053 A * | 10/1993 | Kobayashi et al. | ............. | 396/87 |
| 5,287,137 A * | 2/1994 | Hara et al. | .................... | 396/87 |
| 5,455,649 A * | 10/1995 | Yamada et al. | ................. | 396/87 |
| 5,826,118 A * | 10/1998 | Koga et al. | .................... | 396/87 |
| 5,953,062 A * | 9/1999 | Sugimori et al. | ............. | 348/364 |
| 6,067,116 A * | 5/2000 | Yamano et al. | ............. | 348/372 |
| 6,104,509 A * | 8/2000 | Yoshida | ....................... | 358/509 |
| 6,334,718 B1 | 1/2002 | Akiba et al. | ................. | 396/448 |
| 6,392,703 B1 * | 5/2002 | Uchino et al. | ............... | 348/373 |
| 6,614,997 B2 | 9/2003 | Suzuki | ......................... | 396/86 |
| 6,727,954 B1 * | 4/2004 | Okada et al. | ................. | 348/374 |
| 6,825,881 B1 * | 11/2004 | Fujii | ........................... | 348/335 |
| 6,950,139 B2 * | 9/2005 | Fujinawa | ..................... | 348/335 |
| 6,961,090 B2 * | 11/2005 | Oshima | ....................... | 348/335 |
| 6,982,813 B2 * | 1/2006 | Hirata et al. | .................. | 358/1.9 |
| 7,116,362 B2 * | 10/2006 | Kitajima et al. | .......... | 348/231.4 |
| 7,126,641 B2 | 10/2006 | Suemoto et al. | ............. | 348/372 |
| 7,417,679 B2 * | 8/2008 | Kuruma | ................. | 348/333.02 |
| 2002/0018140 A1 | 2/2002 | Suemoto et al. | ............. | 348/358 |
| 2002/0101515 A1 * | 8/2002 | Yoshida et al. | .............. | 348/211 |

(Continued)

FOREIGN PATENT DOCUMENTS

JP    7-218809    8/1995

(Continued)

*Primary Examiner*—Tuan Ho
*Assistant Examiner*—Kent Wang
(74) *Attorney, Agent, or Firm*—Fitzpatrick, Cella, Harper & Scinto

(57) ABSTRACT

An image pickup apparatus that can accurately correct an error in the position of a taking lens due to a loss of synchronism of the stepping motor during opening and closing of the lens barrier. The position of a taking lens retractable into the body of the image pickup apparatus is detected. A reference position is provided on one of both sides of a section in which the lens barrier is driven to open and close, the one side being a side on which the lens barrier is not driven to open and close.

6 Claims, 11 Drawing Sheets

U.S. PATENT DOCUMENTS

| | | | |
|---|---|---|---|
| 2002/0122665 A1* | 9/2002 | Suzuki | 396/72 |
| 2004/0027476 A1* | 2/2004 | Masuda | 348/335 |
| 2004/0080662 A1* | 4/2004 | Ogino | 348/345 |

FOREIGN PATENT DOCUMENTS

| | | |
|---|---|---|
| JP | 8-327877 | 12/1996 |
| JP | 9-211528 | 8/1997 |
| JP | 2000-347245 | 12/2000 |
| JP | 2001-208956 | 8/2001 |
| JP | 2002-214506 | 7/2002 |

\* cited by examiner

IMAGE PICKUP APPARATUS INCLUDING A LENS BARREL OPENING AND CLOSING A LENS BARRIER PROTECTING A LENS AND CONTROL METHOD THEREFOR, AND CONTROL PROGRAM FOR IMPLEMENTING THE CONTROL METHOD

BACKGROUND OF THE INVENTION

1. Field of the Invention

This invention relates to an image pickup apparatus such as a silver salt film camera, an electronic camera, a digital camera or a video camera and a control method therefor, as well as a control program for implementing the control method.

2. Description of the Related Art

Conventionally, in a retractable-lens camera which is provided with a retractable lens, the zooming and focusing of the lens is typically carried out upon extension of the lens by a lens-extension mechanism. For a lens-extension mechanism for a camera of this type, an arrangement in which an annular drive ring with a cam is rotated to move the lens is widely used. Typically, a DC motor is used as an actuator that rotates the drive ring. Recently, however, with the appearance of compact, high-torque stepping motors, it has become possible to drive the drive ring that rotates a cam of the retractable-lens camera using a stepping motor.

Unlike a DC motor, which requires installation of a feedback system for computer control such as a pulse generator mechanism, a stepping motor does not require a pulse generator mechanism and moreover lends itself easily to digitalized computer control of the rotation because the extent of the rotation is determined by the number of pulses transmitted. Accordingly, stepping motors are more compact and less costly than DC motors.

However, controlling the stepping motor by oscillation pulses involves open-loop control, thus making it difficult to detect a loss of synchronism, i.e., when the motor gets out of step and does not rotate even when pulses are sent. When the stepping motor gets out of step, the lens cam phase slips and an error occurs in the position of the lens, leading to malfunctions such as an inability to focus and runaway operation of the lens barrel during retraction and extension of the lens.

Accordingly, in order to detect such losses of synchronism, conventionally, a reset position is provided for the drive ring rotation phase and the drive ring is reset when a certain rotation phase is reached so as to detect slippage of the cam when the motor gets out of step, with the pulse count corrected whenever slippage is detected. Thus, for example, Japanese Laid-Open Patent Publication (Kokai) No. 2002-214506 describes, in order to accommodate different zoom specifications, applying silver seals at two locations, i.e. a wide-angle side and a telephoto side, and performing lens position detection at both ends of the silver seals, in other words at two locations at the telephoto position and at two locations at the wide-angle position. Moreover, Japanese Laid-Open Patent Publication (Kokai) No. H07-218809 describes providing a lens reference position intermediate between a first position (retracted state) and a second position (standby state) of the lens for controlling the position of the lens.

At the same time, in such retractable-lens cameras, a technology is used in which a lens barrier (which can be opened and closed) for protecting the lens is provided at an end portion of the lens barrel, with the lens barrier being closed when the lens is retracted. A spring is used to open and close the lens barrier. Typically, when retracting the lens, the lens barrier is driven to be closed by tensioning the lens that biases the lens open. Moreover, retractable-lens cameras are typically powered by battery, and thus a technology in which the lens is retracted when it is determined that the battery capacity is low is also disclosed (refer to Japanese Laid-Open Patent Publication (Kokai) No. H09-211528).

However, there have been the following problems with the above-described examples of the prior art:

(1) When opening and closing the lens barrier, a large change occurs in the load applied to the lens. In particular, when closing the lens barrier during retraction of the lens, the actuator that rotates the drive ring must have high torque to tension the spring that opens the barrier. If, for example, an external force is applied to the lens while the barrier is being driven, a large load is imparted to the lens. Consequently, if a stepping motor is used for the actuator, such a stepping motor is likely to get out of step. To avoid such a loss of synchronism, it can be envisaged that the rate of deceleration is increased to compensate for shortage of the torque. However, doing so has the disadvantage of lengthening the start-up time, because the speed at which the lens is extended is reduced.

Therefore, techniques are sought that prevent the stepping motor from getting out of step during driving of the lens barrier without disrupting the speed at which the lens is extended, and that can accurately correct a lens position error due to loss of synchronism on the part of the stepping motor while driving the lens barrier even if such error occurs. However, the prior art has been unable to achieve such techniques.

For example, according to the art disclosed in Japanese Laid-Open Patent Publication (Kokai) No. 2002-214506, although it does enable photographing and zoom position correction because lens position detection is carried out at both ends of the silver seals, that is, at two locations at the telephoto position and at two locations at the wide-angle position, if the stepping motor undergoes a loss of synchronism due to driving of the lens barrier while retracting the lens, because the position of the lens in the vicinity of the retracted position cannot be corrected, the camera might mistakenly determine that the lens has been fully retracted when in fact the lens has not been fully retracted.

Moreover, in the art disclosed in Japanese Laid-Open Patent Publication (Kokai) No. H07-218809, only a single reset position (reference position) is provided at a location intermediate between the first position (retracted state) and the second position (standby state). Accordingly, when driving the lens barrier in the zone between the first position and the second position, when the lens moves in either an extension direction or a retraction direction, the lens necessarily moves through a lens barrier drive zone after being reset while the lens moves to the first position or the second position, and consequently the position of the lens cannot be corrected when the stepping motor undergoes a loss of synchronism in the lens barrier drive zone through which the lens barrier is driven.

(2) As a process carried out when the battery is low, Japanese Laid-Open Patent Publication (Kokai) No. H09-211528 teaches retracting the lens and putting the camera into a state in which photography is not enabled when the battery capacity is low. However, a drawback of this technology is that photography cannot be continued until the battery is almost fully depleted. Attempting to maintain a state in which photography is enabled even when the battery is nearly drained risks a loss of synchronism of the stepping motor that rotates the zoom drive ring, resulting in a loss of rotation because, with a stepping motor, it is the pulse rate that determines the drive speed even when there is a drop in power voltage, and therefore there is no decrease in drive speed attendant upon a voltage drop.

SUMMARY OF THE INVENTION

It is a first object of the present invention to provide an image pickup apparatus and a control method therefor, and a control program that can accurately correct an error in the position of a taking lens due to a loss of synchronism of the stepping motor during opening and closing of the lens barrier.

A second object of the present invention is to provide an image pickup apparatus that can prevent a loss of synchronism of the stepping motor when closing the lens barrier and at the same time shorten start-up time by increasing the speed at which the taking lens is extended from the body of the camera.

A third object of the present invention is to provide an image pickup apparatus that can continue photographing until the battery is almost fully depleted.

To attain the first object, according to a first aspect of the present invention, there is provided an image pickup apparatus comprising an image pickup apparatus comprising a body, a taking lens retractable into the body of the image pickup apparatus, a lens barrier for protecting the lens, a lens barrel disposed to open the lens barrier while the taking lens moves from a retracted position thereof to a shooting zone and close the lens barrier while the taking lens moves from the shooting zone to the retracted position, the lens barrel having a reference position set therein for correction of a position of the taking lens, and a position control device that controls a position of the lens barrel, the position control device comprising a detecting device that detects the position of the taking lens, the reference position is provided on at least one of both sides of a section in which the lens barrier is driven to open and close, the one side being a side on which the lens barrier is not driven to open and close.

With this construction, even if an error arises in the position of the taking lens when opening and closing the lens barrier, such an error can be corrected promptly based on the reference position.

Preferably, the reference position is provided at a first section between a lens barrier open position at which the lens barrier is fully open and the shooting zone, and at a second section between a lens barrier closed position at which the lens barrier is fully closed and the retracted position.

With this construction, after the position has been corrected in the first section, the lens can be moved to a shooting zone without passing through a zone of large load fluctuation, and therefore focus point adjustment can be carried out with no error in the position of the lens, thus making high-accuracy focus adjustment possible.

To attain the second object, in a preferred form of the first aspect of the present invention, the image pickup apparatus comprises a pulse-controlled drive device, and the taking lens is disposed to be moved by the pulse-controlled drive device, the position control device decreases a pulse rate of the drive device to decelerate the drive device when the lens barrier is driven to close, and increases the pulse rate of the drive device to accelerate the drive device when the lens barrier is driven to open.

With this construction, the pulse rate of the drive device is lowered when closing the lens barrier so as to decelerate the drive device, and therefore a loss of synchronism of the drive device when closing the lens barrier can be prevented. Moreover, the pulse rate is raised when opening the lens barrier so as to accelerate the drive device, making it possible to increase the speed at which the image pickup lens is extended can be increased and thus shorten the start-up time.

To attain the third object, in a more preferred form of the first aspect of the present invention, the image pickup apparatus comprises a voltage detecting device that detects a voltage of a battery, and the drive device is disposed to be operated by battery power, and the position control device changes the pulse rate of the drive device when the lens barrier is driven to open, according to results of detection by the voltage detecting device.

With this construction, the pulse rate of the drive device is changed when opening the lens barrier depending on the results of the battery voltage detection, so that, for example when the remaining battery capacity is sufficient, it is possible to increase the pulse rate and thus increase the speed at which the lens section is extended, and therefore shorten the start-up time.

Moreover, even when the battery capacity is insufficient, by lowering the pulse rate and driving the image pickup lens at low speed, the image pickup apparatus can be put into a state in which shooting is enabled, enabling photographing to continue until the remaining battery capacity is almost fully depleted.

To attain the first object, according to a second aspect of the present invention there is provided a control method of controlling a lens barrel position of a lens barrel of an image pickup apparatus comprising a taking lens retractable into a body of the image pickup apparatus, a lens barrier for protecting the taking lens, and a lens barrel disposed to open the lens barrier while the taking lens moves from a retracted position thereof to a shooting zone and close the lens barrier while the taking lens moves from the shooting zone to the retracted position, the lens barrel having a reference position set therein for correction of a position of the taking lens, the control method comprising a reference position step of setting in advance a reference position on at least one of both sides of a section in which the lens barrier is driven to open and close, a detecting step of detecting a position of the taking lens, a correcting step of correcting the position of the taking lens detected in the detecting step based on the reference position, and an executing step of sequentially executing the detecting step and the correcting step.

To attain the first object, according to a third aspect of the present invention there is provided a computer-readable control program for executing a control method of controlling a lens barrel position of a lens barrel of an image pickup apparatus comprising a taking lens retractable into a body of the image pickup apparatus, a lens barrier for protecting the taking lens, and a lens barrel disposed to open the lens barrier while the taking lens moves from a retracted position thereof to a shooting zone and close the lens barrier while the taking lens moves from the shooting zone to the retracted position, the lens barrel having a reference position set therein for correction of a position of the taking lens, the control method comprising a reference position module for setting in advance a reference position on at least one of both sides of a section in which the lens barrier is driven to open and close, a detecting module for detecting a position of the taking lens, a correcting module for correcting the position of the taking lens detected in the detecting module based on the reference position, and an executing module for sequentially executing the detecting module and the correcting module.

To attain the second object, according to a fourth aspect of the present invention, there is provided an image pickup apparatus comprising a body, a taking lens retractable into the body of the image pickup apparatus, a lens barrier for protecting the lens, a lens barrel disposed to open the lens barrier while the taking lens moves from a retracted position thereof to a shooting zone and close the lens barrier while the taking lens moves from the shooting zone to the retracted position, the lens barrel having a reference position set therein for correction of a position of the taking lens, and a position control device that controls a position of the lens barrel, the position control device comprising a detecting device that detects the position of the taking lens, the reference position is provided at a position at which driving of the lens barrier to close is completed.

To attain the first object, according to a fifth aspect of the present invention, there is provided an image pickup apparatus comprising a body, a taking lens retractable into the body of the image pickup apparatus, a lens barrier for protecting the lens, a lens barrel disposed to open the lens barrier while the taking lens moves from a retracted position thereof to a shooting zone and close the lens barrier while the taking lens moves from the shooting zone to the retracted position, the lens barrel having a reference position set therein for correction of a position of the taking lens, and a position control device that controls a position of the lens barrel, the position control device comprising a detecting device that detects the position of the taking lens, wherein the reference position is provided on at least one of both sides of a section in which the lens barrier is driven to open and close.

The above and other objects, features and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
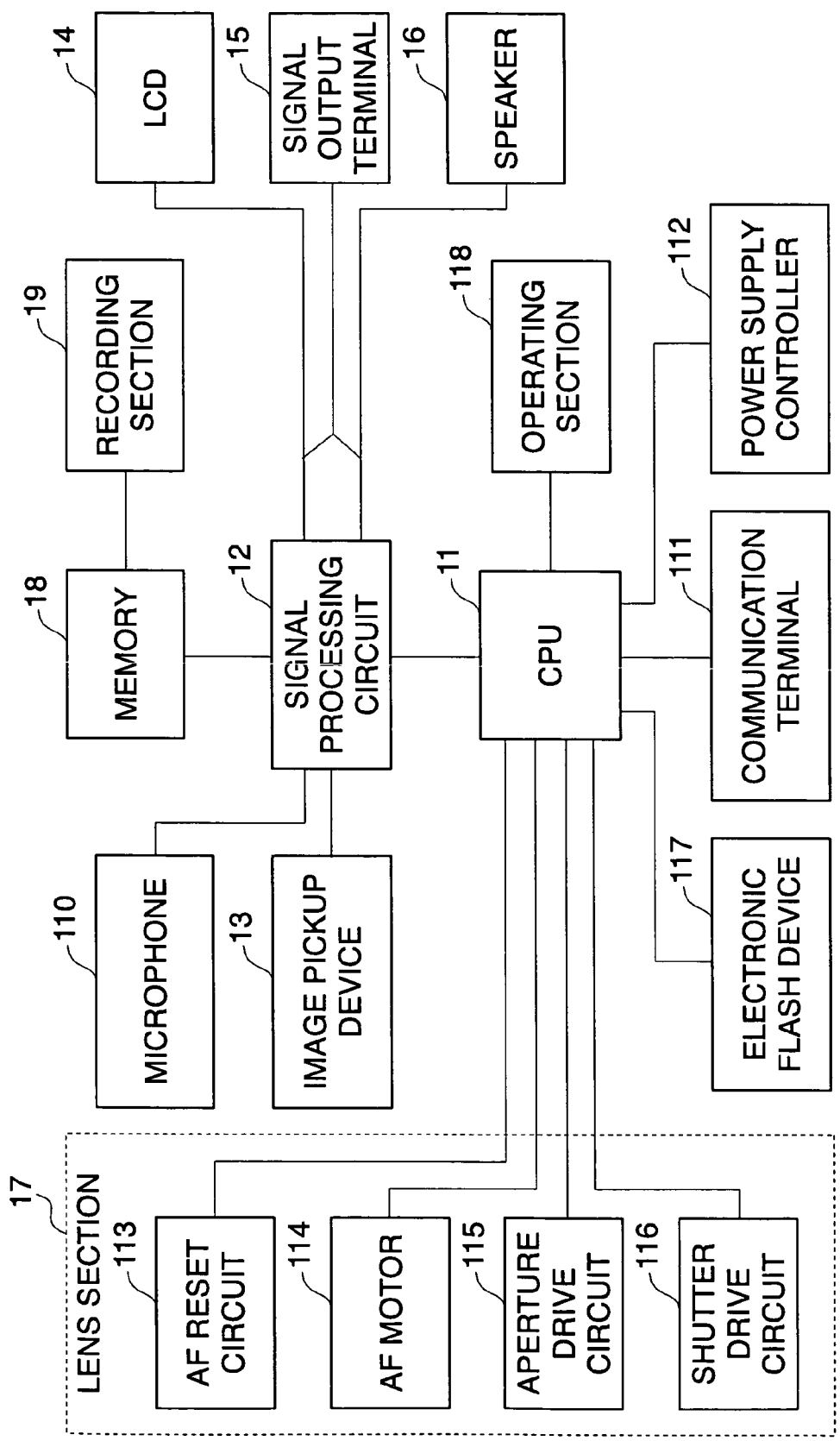
FIG. 1 is a block diagram showing the electrical configuration of a digital camera as an image pickup apparatus according to a first embodiment of the present invention.

FIG. 1 is a block diagram showing the electrical configuration of a digital camera as an image pickup apparatus according to a first embodiment of the present invention.

The digital camera includes a CPU 11 that controls the operation of the entire camera, to which a signal processing circuit 12 is connected. Connected to the signal processing circuit 12 are an image pickup device 13 such as a CCD, a microphone 110 that inputs audio, an LCD 14 as an image display device, signal output terminals 15 for outputting image signals and audio signals to external devices, a speaker 16 that outputs audio signals, and a memory 18.

The image pickup device 13 photoelectrically converts an image focused by a lens section 17 into an electrical signal and outputs the same as a video signal. The signal processing circuit 12 subjects the video signal to various processing including A/D conversion, gamma processing, and compression, D/A conversion. The microphone 110 converts audio into an electrical signal and outputs the same to the signal processing circuit 12.

The video and audio signals processed by the signal processing circuit 12 are then displayed by the LCD 14 and output by the speaker 16, respectively, as video and audio outputs, and at the same time output through the signal output terminals 15 to a monitor or other external device outside the digital camera.

Connected to the CPU 11 are an operating section 118, a communication terminal 111, a power supply controller 112 and an electronic flash device 117 are connected to the CPU 11, as well as various circuits of the lens section 17 (i.e., AF reset circuit 113, AF motor 114, aperture drive circuit 115 and shutter drive circuit 116).

The operating section 118 is comprised of a variety of switches for controlling the operation of the digital camera, such as operating buttons and a release button. The power supply controller 112 is comprised of a battery, not shown, that supplies electrical power to the digital camera as a whole, a DC/DC converter that creates voltages supplied to various parts, a control circuit that controls voltage currents supplied to various parts, and a battery check circuit that measures voltage to check the battery.

When shooting a moving image, a video signal output from the image pickup device 13 is processed by the signal processing circuit 12, autoexposure (AE) is carried out using the processed signal to determine an exposure amount, and the aperture drive circuit 115 is activated to determine an aperture value.

When shooting a still image, by pressing the release button, not shown, provided in the operating section 118, first, the AF reset circuit 113 and the AF motor 114 are activated so as to focus an object image through the lens section 17. Then, autoexposure is carried out using the output from the image pickup device 13 to determine the aperture value and shutter speed that provide the optimum exposure, and the aperture drive circuit 115 is driven to control the aperture for optimum exposure.

Next, the image pickup device 13 is reset and charge accumulation is started by photoelectric conversion. The shutter drive circuit 116 is driven to close the shutter so as to achieve the shutter speed determined by the autoexposure. If the exposure is insufficient, the electronic flash device 117 is activated within a time period for which the shutter is open from the start of charge accumulation. The photographed video signal is then processed by the signal processing circuit 12 and the processed still image data is buffered in the memory 18 and recorded on a replaceable memory medium by a recording section 19.

Figure 2:
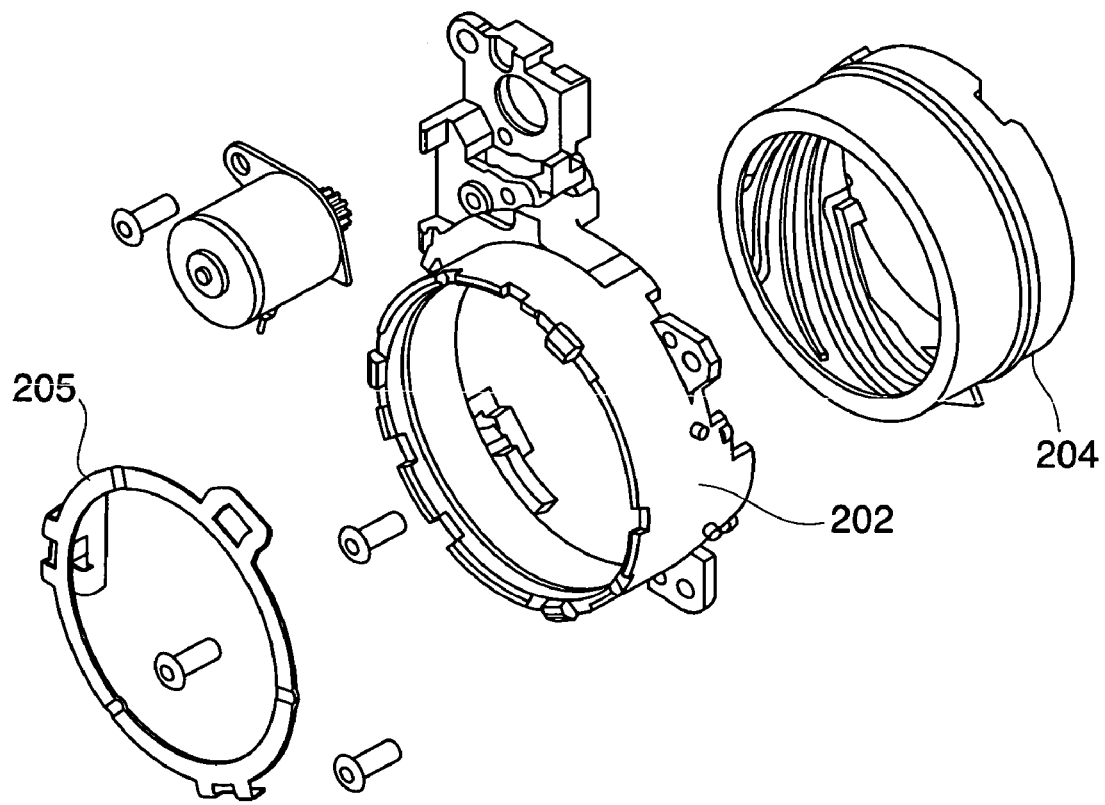
FIG. 2 is an exploded perspective view of a lens barrel of the digital camera in FIG. 1.
Figure 3:
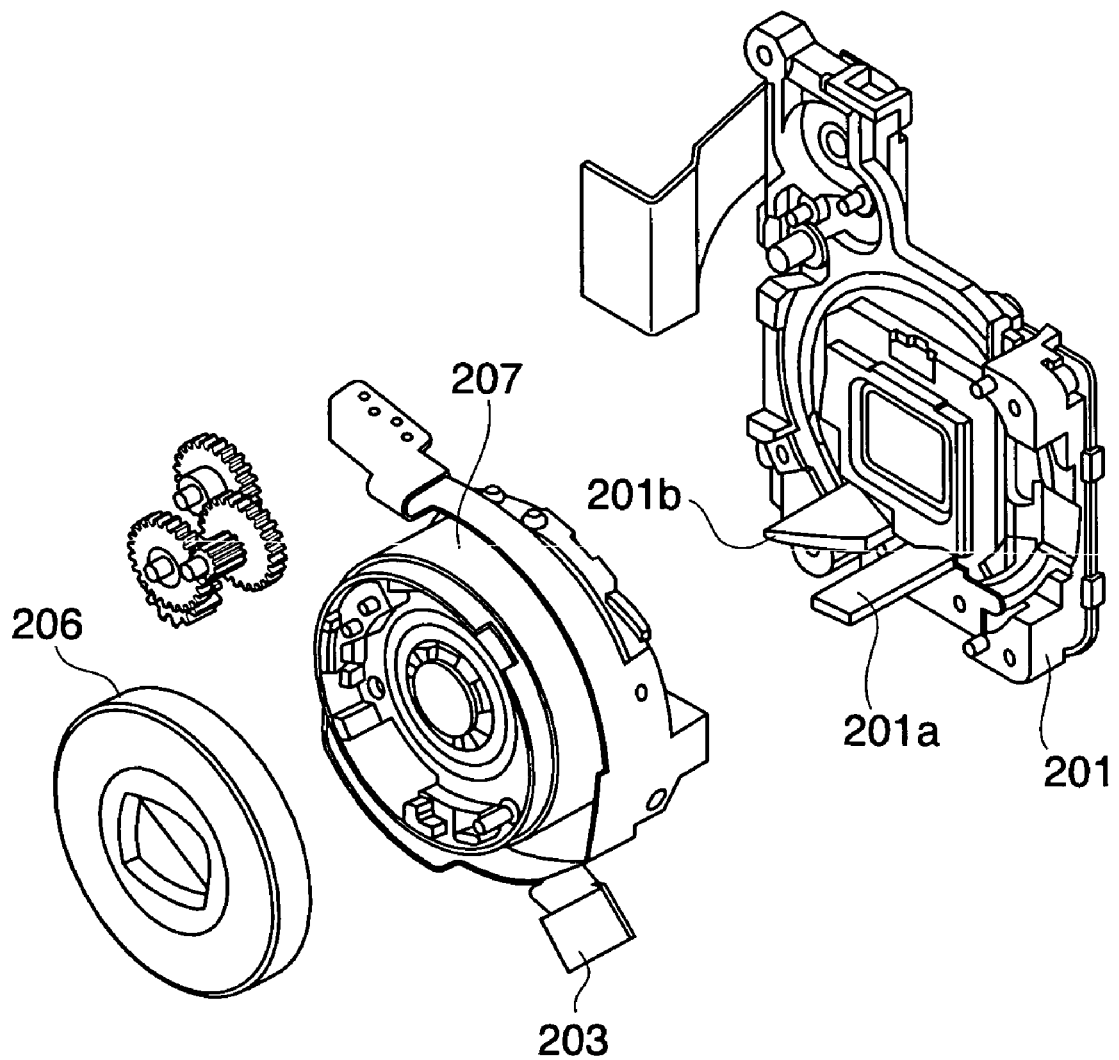
FIG. 3 is an exploded perspective view of the lens barrel of the digital camera in FIG. 1.

FIGS. 2 and 3 are exploded perspective views of a lens barrel of the digital camera in FIG. 1.

In FIGS. 2 and 3, reference numeral 201 designates a CCD holder unit. The CCD holder unit 201 is a frame that retains image pickup and optical parts such as a CCD and a low pass filter, and forms a single unit together with a translatory movement key 201a and a barrier cam part 201b. Reference numeral 202 designates a fixed lens barrel formed of an electrically nonconductive material, and reference numeral 204 designates a drive ring. The fixed lens barrel 202 serves to restrict movement of the drive ring 204 in a direction of rotation thereof. Reference numeral 205 designates a bias spring formed of a metal leaf spring.

The drive ring 204 is disposed between the CCD holder unit 201 and the fixed lens barrel 202, and is urgingly biased toward the CCD holder unit 201 by the bias spring 205 so as to fix the position of the drive ring 204 along the optical axis. The drive ring 204 and the bias spring 205 are in direct contact with each other, and are electrically connected to each other at the same electric potential.

Reference numeral 206 designates a barrier unit, which is comprised of two barrier blades which are opened and closed to protect the lens when the lens is retracted into the camera.

Reference numeral 207 designates a lens section unit (corresponding to the lens section 17 in FIG. 1). The lens section unit 207 supports the lens section and contains the aperture and the shutter, with the aperture and shutter driven by electrical signals transmitted through a lens barrel tab 203. The translatory movement key 201a engages a groove in the lens section unit 207 so that the lens section unit 207 can move forward and back along the optical axis.

Next, a description is given of the operation of the barrier unit 206.

Figure 4:
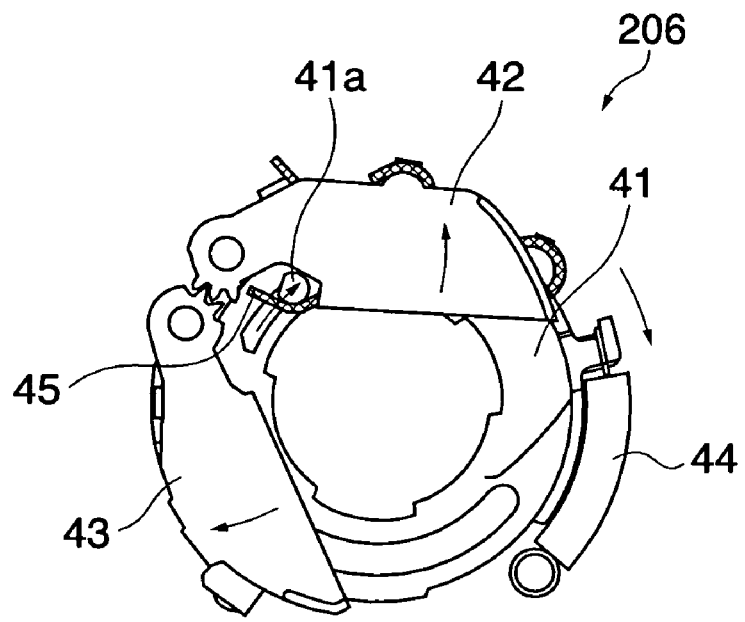
FIG. 4 is a view useful in explaining the operation of a barrier unit in FIG. 3.
Figure 5:
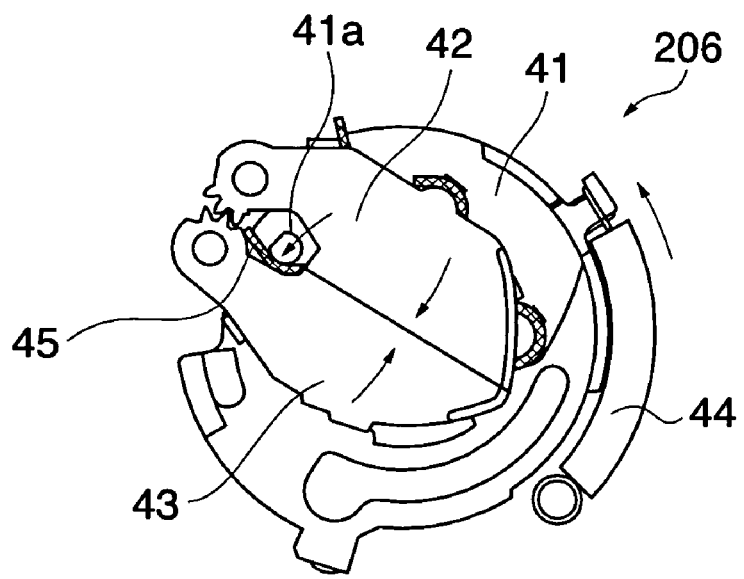
FIG. 5 is a view useful in explaining the operation of the barrier unit in FIG. 3.

FIGS. 4 and 5 are views useful in explaining the operation of the barrier unit 206 in FIG. 3, with FIG. 4 showing the barrier unit in an open state and FIG. 5 showing the barrier unit in a closed state.

In the views, reference numeral 41 designates a barrier drive ring, as a member that drives the barrier unit 206, 42 a barrier blade (1), and 43 a barrier blade (2). Reference numeral 44 designates an opening spring that imparts a load to the barrier drive ring 41 in a direction in which it opens, and reference numeral 45 designates a closing spring. The closing spring 45 is a hook-shaped spring, which engages a projecting part 41a formed on the barrier drive ring 41. The force of the closing spring 45 pulls and biases the barrier blade (1) 42 in a direction in which it closes. The barrier blade (1) 42 and the barrier blade (2) 43 are meshed with each other via gears formed on rotation axes thereof, so that, when the barrier blade (1) 42 rotates, the barrier blade (2) 43 rotates in the opposite direction.

To bring the barrier unit 206 into the open state shown in FIG. 4, the barrier drive ring 41 is rotated clockwise by the opening spring 44, so that the first barrier blade (1) 42 is pressed by the projecting part 41a to be rotated counter-clockwise. Accordingly, the barrier blade (2) 43 is also rotated clockwise, opening the lens barrier.

Next, a description is given of when the lens barrier is closed. The barrier drive ring 41 inside the barrier unit 206 is depressed by a cam surface of the barrier cam part 201b and the barrier drive ring 41 rotates counter-clockwise against the force of the opening spring 44. At this time, the projecting part 41a drops down as a result of the rotation, and accordingly, at the same time the barrier blade (1) 42 rotates clockwise due to the action of the closing spring 45. Then, the meshing of the gears causes the barrier blade (2) 43 to rotate counter-clockwise as well, stopping at a point at which the two blades 42, 43 meet. The barrier drive ring 41 can rotate up to the state shown in FIG. 5. The projecting part 41a continues to rotate and pulls the closing spring 45 even when the barrier blade (1) 42 stops, to thereby augment the closing force of the barrier.

As described above, the image pickup apparatus of the present invention is configured such that the barrier unit 206 is combined with the lens section unit 207 and these two parts are moved as a single unit forward and back along the optical axis, whereby the action of the barrier drive ring 41 inside the barrier unit 206 urgingly contacting the cam surface of the barrier cam part 201b and the spring force of the opening spring 44 cause the barrier drive ring 41 to be rotated, and the rotation of the barrier drive ring 41 and the action of the closing spring 45 cause the two barrier blades 42, 43 to be opened and closed.

Next, a description is given of the relationship between the state of the barrier, reset timing of the lens and extension of the lens.

Figure 6:
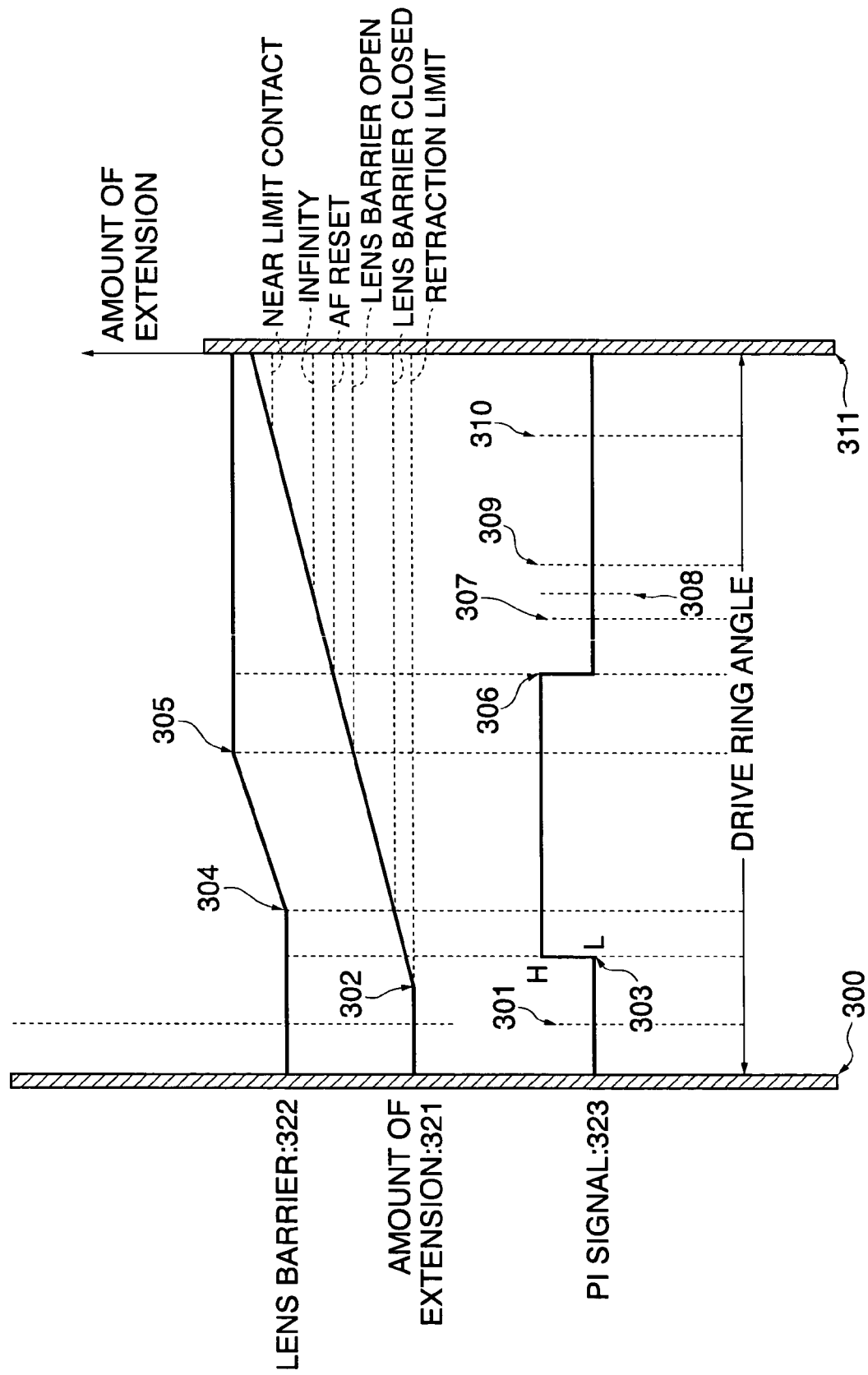
FIG. 6 is a diagram showing the relationship between a lens barrier state, focus lens reset timing and an extension state of a focus lens, plotted with respect to the rotational angle of a drive ring.

FIG. 6 shows the relationship between the lens barrier state, the focus lens reset timing and extension of the focus lens, plotted with respect to the rotational angle of the drive ring 204.

In FIG. 6, the abscissa indicates the rotational angle of the drive ring 204. With rotation of the drive ring 204, the focus lens is extended. In FIG. 6, reference numeral 321 indicates the amount of extension of the focus lens. Reference numeral 322 indicates the state of the barrier at this time, and reference numeral 323 indicates a reset signal (PI signal: photo interrupter output).

Reference numerals 300 and 311 in FIG. 6 designates a retraction limit contact 300 and a near limit contact 311. As a stopper of the drive ring 204 mechanically strikes the contact 300 or 311, the rotation of the drive ring 204 stops, thus preventing the focus lens from moving to an excessive degree.

When the AF motor 114 starts to rotate from a retraction limit position 301 thereof, the focus ring remains stopped until the rotational angle of the drive ring 204 reaches a predetermined angle indicated by a position 302. Immediately after the rotational angle of the drive ring 204 exceeds the predetermined position 302, the focus lens starts to be extended. At a position 303 immediately after the start of extension of the focus lens, the reset signal 323 switches from a low level ("L") to a high level ("H").

Figure 7A:
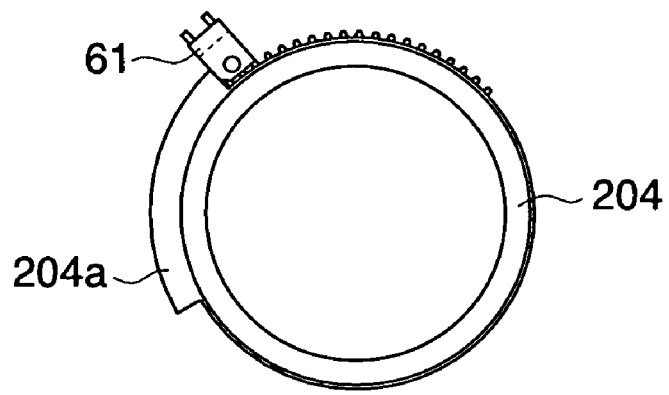
FIGS. 7A, 7B and 7C are diagrams showing the relationship between a drive ring and a photo interrupter with the drive-ring in a retraction limit position, a barrier open position, and a near limit position, respectively.
Figure 7B:
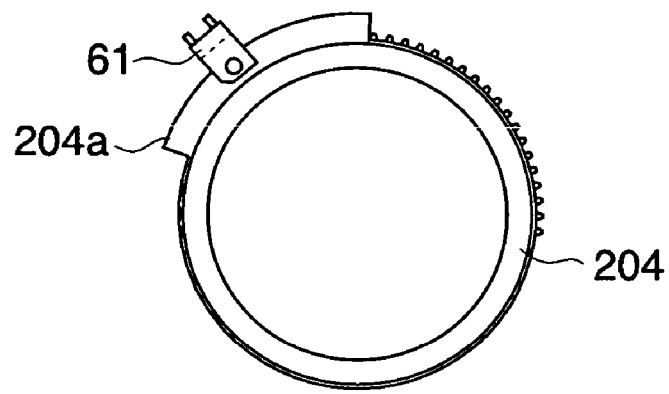
Figure 7C:
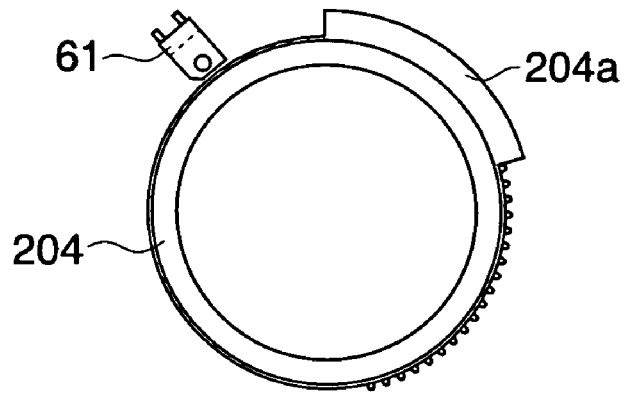

Here, how the reset signal 323 switches will be described with reference to FIGS. 7A, 7B and 7C. FIGS. 7A, 7B and 7C are diagrams illustrating the relationship between the drive ring 204 and a photo interrupter (PI) 61 as a reset member. A state corresponding to the retraction limit position 301 in FIG. 6 is shown in FIG. 7A, a state corresponding to a barrier open position 305 in FIG. 6 is shown in FIG. 7B and a state corresponding to a near limit position 310 in FIG. 6 is shown in FIG. 7C. Reference numeral 204a in FIGS. 7A, 7B and 7C designates a flange formed integrally with the drive ring 204. An LED and a photoreceptive element as a light sensor are disposed within the photo interrupter 61. The light sensor outputs a "H" level output when the flange 204a blocks light emitted from the LED, and otherwise, it outputs a "L" level output.

As described above, at the position 303 the reset signal 323 switches to "H". As the focus lens is further extended, the barrier unit 206, through the action of the barrier cam part 201*b*, gradually opens the lens barrier at a phase at which the drive ring 204 rotates from the barrier closed position 304 to the barrier open position 305. The lens barrier is fully opened at the barrier open position 305, and after this barrier open position 305 is exceeded, the cam surface of the barrier cam 201*b* and the barrier drive ring 41 become separated.

Similarly, when the drive ring 204 rotates in reverse as well, at the barrier open position 305 the barrier cam 201*b* and the barrier drive ring 41 are brought into contact each other. Then, the barrier drive ring 41 further rotates to start to tension the opening spring 44, and then, as the barrier drive ring 41 moves from the barrier open position 305 toward the barrier closed position 304, the lens barrier is gradually closed. The amount of tension on the opening spring 44 changes over the section from the barrier closed position 304 to the barrier open position 305. Therefore, the torque needed for rotation of the drive ring 204 changes within this section irrespective of the direction of movement of the drive ring 204. Also, the section in which the change in torque is large is within a section in which the reset signal 323 is at "H" level. Moreover, on the extension side of the barrier open position 305, the spring force of the opening spring 44 does not affect the rotation of the drive ring 204.

When the drive ring 204 is further rotated from the lens barrier open position 305 in a direction in which the focus lens is extended, after the drive ring 204 passes a position 306, the flange 204*a* passes the photo interrupter 61, so that the former no longer blocks the latter. Thus the reset signal 323 switches to "L" at the position 306. This position 306 is the AF reset position.

A phase of a position 307 to which the drive ring 204 is further rotated to further extend the lens is set as an AF scan starting point. Ordinarily, when the power is turned on or after shooting, the focus lens is stopped at the position 307. When the drive ring 204 is slightly rotated from the position 307, a focus lens extension position 308 at which the focus is at infinity is reached. A position 309 that is reached by further extension of the focus lens is a fixed point position. The fixed point position 309 is a position determined by the circle of least confusion and the f-number such that focusing can be achieved over the largest possible range from infinity to a close range during pan focus. When the focus position cannot be detected during pan focus or AF (Auto Focus), photography is carried out with the focus lens at this fixed point position 309. As the focus lens is further extended, the focus adjustment range gradually approaches toward a closer range, eventually reaching the near limit position 310.

Figure 8:
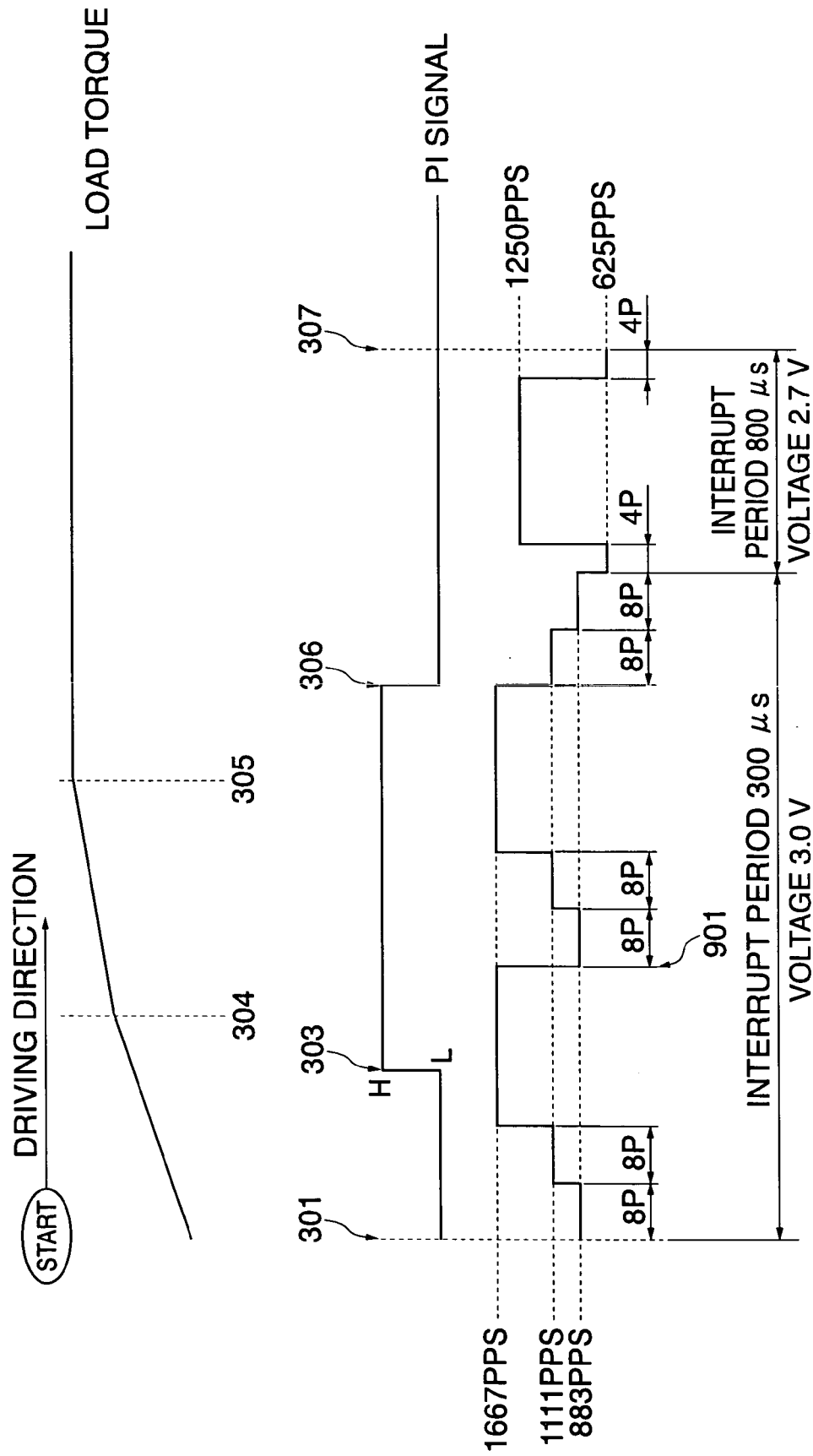
FIG. 8 is a sequence diagram showing a sequence carried out immediately after power is turned on when it is determined that battery capacity is sufficient.
Figure 9:
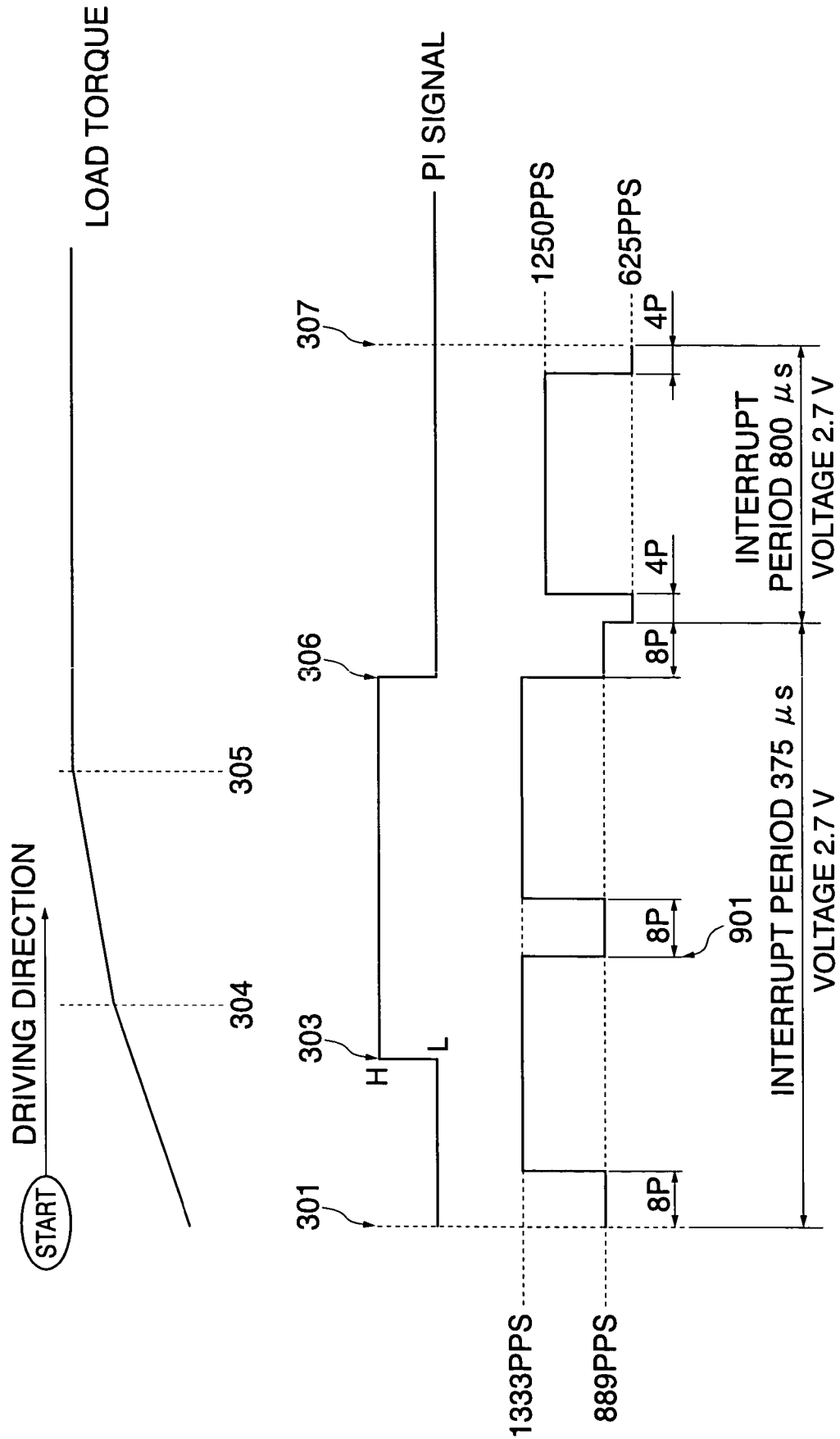
FIG. 9 is a sequence diagram showing a sequence carried out immediately after the power is turned on when it is determined that the battery capacity is insufficient.

Next, a description will be given of a sequence for moving the lens barrel carried out immediately after the power is turned on. FIG. 8 is a sequence diagram showing a sequence carried out immediately after the power is turned on when it is determined that battery capacity is sufficient. FIG. 9 is a sequence diagram showing a sequence carried out immediately after the power is turned on when it is determined that the battery capacity is insufficient.

When the power is turned on, the battery check circuit in the power supply controller 112 checks the voltage of the battery and compares the result with a predetermined threshold value. If the result indicates that the battery voltage exceeds the threshold value, the remaining battery capacity is deemed to be sufficient and then the sequence in FIG. 8 is executed. If the result indicates that the battery voltage is below the threshold value, the remaining battery capacity is deemed to be insufficient and then the sequence in FIG. 9 is executed.

When the battery capacity is sufficient, according to the sequence in FIG. 8, a voltage supplied to the AF motor 114 implemented by a stepping motor is set to 3.0 volts higher than the minimum required voltage. The frequency of pulses supplied to the AF motor 114 is determined by the period of interruption that can be applied. The interrupt period is set to 300 μs.

Then, as shown in FIG. 8, first, the AF motor 114 is rotated by 8 pulses at a drive frequency of 883 PPS from the retraction limit position 301, and from the next pulse the drive frequency is changed to 1111 PPS and the AF motor 114 is rotated by 8 pulses. The drive frequency is then further changed to 1667 PPS and the AF motor 114 continues to be rotated. A stepping motor is used for the AF motor 114, and therefore, by stepwise accelerating as stated above, the number of rotations can be increased up to a speed at which the stepping motor cannot be rotated by "pull-in torque". Moreover, in this case, to compensate for a drop in the torque caused by the increased drive frequency of the stepping motor, the voltage supplied to the stepping motor is increased to 3.0 volts so as to suppress the drop in the torque.

The drive ring 204 is thus rotated by the rotation of the AF motor 114 to extend the focus lens. At a position 901 past a position 303 at which the reset signal (PI) 323 switches from "L" to "H", a PI determination sequence (reset signal determination process) is started. At this time, the drive frequency is decelerated to the initial speed of 883 PPS. Then, the battery check is again carried out, and if it is determined that the battery voltage has fallen below the threshold value and the remaining battery capacity is insufficient, the interrupt period is switched, followed by the sequence in FIG. 9 being executed.

On the other hand, if it is determined that the voltage is sufficient, the drive frequency is again accelerated in two stages by 8 pulses, so that the AF motor 114 is rotated at the drive frequency of 1667 PPS. Then, the AF motor 114 is driven to bring the drive ring 204 to the AF reset position 306, and after resetting, the AF motor 114 is again decelerated in two stages by 8 pulses, so that the AF motor 114 is rotated at the drive frequency of 1111 PPS and then 883 PPS.

Thereafter, the interrupt period is set to 800 μs and the drive voltage is switched to 2.7 volts. After the AF motor 114 is driven by 4 pulses at a drive speed of 625 PPS determined by the 800 μs interrupt period, the AF motor 114 is then driven at 1250 PPS to a point 4 pulses before the scan starting point 307. Then, the drive speed is decelerated to 625 PPS and the AF motor 114 is stopped at the scan starting point 307.

The AF motor is thus moved at 1667 PPS up to the AF reset position 306 because, even if the AF motor gets out of step and the pulse count and the position of the lens lose synchronism, the AF motor is reset at the AF reset position 306 so that the pulse count can be corrected according to the position of the lens. Moreover, a force that releases the tension of the opening spring 44 of the lens barrier acts up to the barrier open position 305, which creates surplus torque that can be used for high-speed drive of the focus lens. Moreover, the position 305 and the position 306 are disposed as close to each other as possible. After the reset, no deviation in the position of the lens is permitted, and therefore, the AF motor 114 is driven at a speed lower than the speed at which it has been driven up to the AF reset position 306, i.e. at a speed of 1250 PPS, so as to provide surplus torque.

On the other hand, when the battery check indicates that the voltage is below the threshold value, the drive sequence shown in FIG. 9 is executed.

As can be seen from a comparison with the sequence of FIG. 8, the sequence in FIG. 9 differs in the voltage applied to the AF motor 114 and the interrupt period, as well as the drive frequency and the number of acceleration/deceleration steps, which are applied from the retraction limit position 301 until deceleration after the AF reset position 306. Specifically, the voltage is 2.7 volts, which is an ordinary voltage, and the interrupt period is set to 375 μs. The AF motor 114 is first driven by 8 pulses at a drive speed of 889 PPS determined by the interrupt period, after which it is driven at 1333 PPS. A PI determination is carried out at the same position 901 as in FIG. 8.

The remaining operations are the same as when the battery capacity is deemed to be insufficient by the PI determination in FIG. 8. Namely, after the AF motor is driven by 8 pulses at 889 PPS in one stage, the AF motor is driven at 1333 PPS up to the AF reset position 306, reset at the position 306, and then driven at a decelerated speed of 889 PPS by 8 pulses, after which the interrupt period is set to 800 μs and thereafter the AF motor is driven by only 4 more pulses at 625 PPS before the drive frequency becomes 1250 PPS, as is the case with the sequence in FIG. 8. During this driving as well the voltage is set to the lower voltage of 2.7 volts. However, up to the AF reset position 306 the count can be corrected and the load decreases due to the force of the spring, and therefore the drive frequency used from the retraction limit position 301 up to the AF reset position 306 is set to 1333 PPS higher than the 1250 PPS used after the reset.

Thus, as described above, with respect to the sequence immediately after power-on, when the remaining battery capacity is deemed to be sufficient and even when the battery capacity is deemed to be insufficient, the drive frequency is set to be higher up to the AF reset than an ordinary drive frequency used after the AF reset in order to drive the AF motor more quickly. As a result, the lens extension is faster and the start-up time can be shortened. This high speed operation is possible because the force of the opening spring 44 lightens the load exerted on the AF motor 114 up to the barrier open position 305 and thus creates surplus torque, and because the drive speed is decreased to an ordinary low speed after resetting, which makes it possible to correct the pulse count at the reset even if the drive speed used until the reset is fast enough to run the risk of a loss of synchronism and hence the lens getting out of position.

After AF reset, by counting the number of pulses by which the lens has been moved from the AF reset position 306 with reference to the same position, the lens can be extended to a position that corresponds to the scan starting point or the subject distance.

Moreover, when the battery check indicates that the remaining battery capacity is sufficient, the AF motor 114 is driven at a higher speed through a multiple steps of acceleration than when the remaining battery capacity is determined to be insufficient. As a result, the speed at which the lens can be extended from the body of the camera can be increased, thus reducing the start-up time required before shooting can be started after the power is turned on with the lens being fully retracted.

Figure 10:
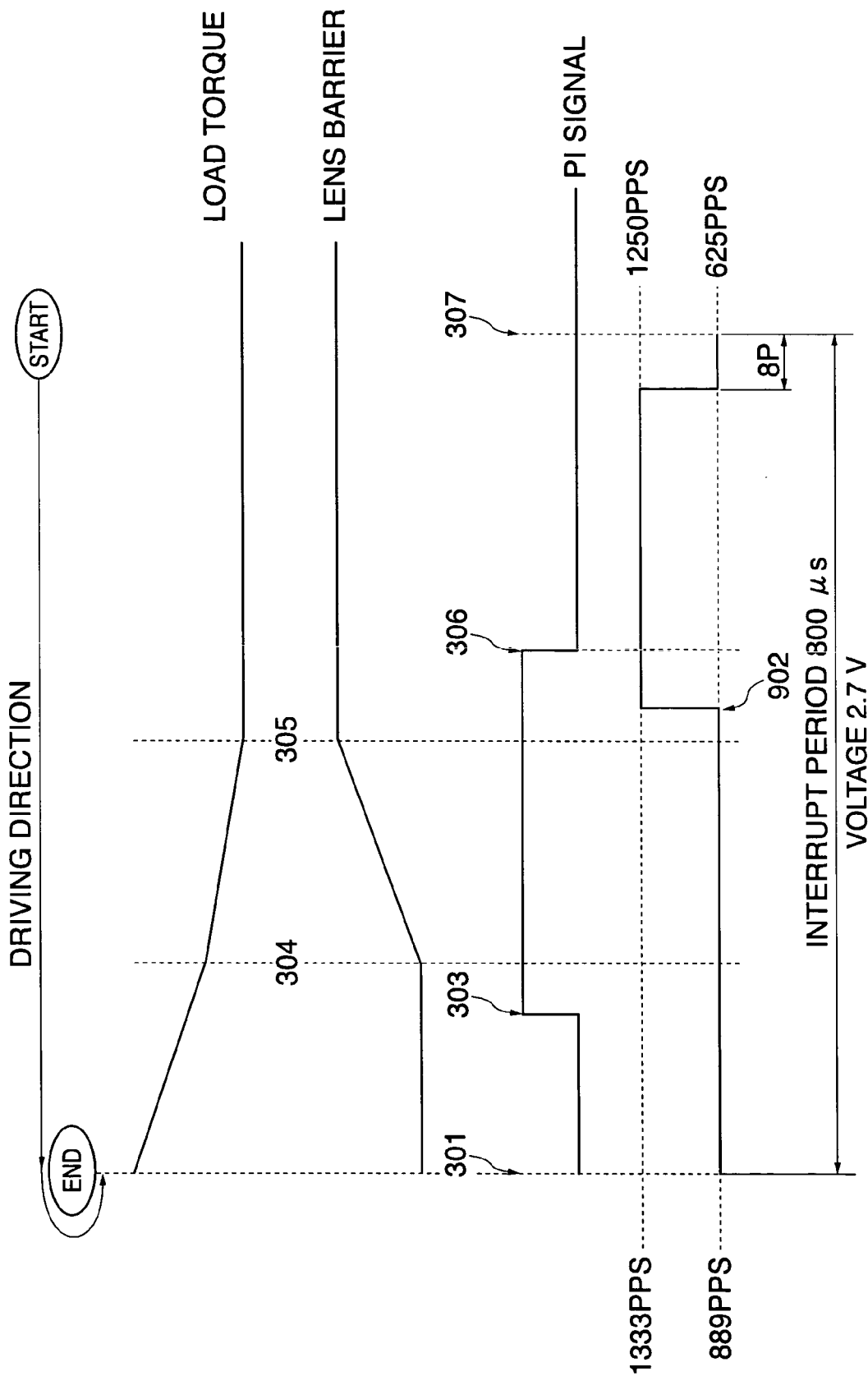
FIG. 10 is a sequence diagram showing a sequence carried out immediately after the power is turned off.

Next, a description will be given of a sequence carried out immediately after the power is turned off. FIG. 10 is a sequence diagram showing the sequence carried out immediately after the power is turned off. A position at which the focus lens is stopped after the power is turned on or after shooting is always the scan starting point 307. Therefore, the sequence immediately after power off, as shown in FIG. 10, starts from the scan starting point 307, from which the AF motor 114 is driven by 8 pulses in the direction of retraction at a normal interrupt period of 800 μs, with a voltage of 2.7 volts applied to the AF motor 114 and at a drive speed of 625 PPS, after which the AF motor 114 is accelerated to 1250 PPS. Then, at a position 902 just before the barrier open position 305 at which the lens barrier starts to close, the AF motor 114 is decelerated to 625 PPS. This decelerating position 902 is disposed intermediate between the barrier open position 305 and the AF reset position 306. A large drive torque is required to tension the opening spring 44 while the focus lens is on the retraction side of the barrier open position 305, and therefore the AF motor 114 is decelerated to and driven at 625 PPS until the AF motor 114 stops at the retraction limit position 301. When the stepping motor is driven at such a low speed, its torque increases even if the voltage applied thereto is not changed, making it more difficult for a loss of synchronism to occur.

After the AF motor 114 passes the barrier closed position 304, the tension of the closing spring 45 is added and the load on the AF motor 114 further increases as the AF motor approaches the retraction limit position 301. Accordingly, the possibility of the occurrence of a loss of synchronism increases in the vicinity of the retraction limit, and therefore the reset position 303 is provided near the retraction limit. After retraction limit position reset is carried out at the reset position 303, the AF motor 114 is driven to a position set as the retraction limit position, which is reached after driving a predetermined number of pulses from the reset position 303.

The AF motor 114 uses a large number of gears for acceleration and deceleration, and thus undergoes gear backlash. As a result, the driving of the lens is accompanied by a difference in the position of the lens between when the AF motor is moved in one direction and when it is moved in the opposite direction. To address this problem, the AF motor 114 is not stopped when it is at the retraction limit position 301 but, to shorten the next start-up time, a number of pulses required to eliminate this position difference is applied to the AF motor 114 so as to rotate the motor in reverse, after which it is then stopped.

During shooting, the functions for shooting often use interrupt processing, and as described above, there is surplus torque, and an interrupt period of 800 μs alone is used, with drive speeds of 625 PPS and 1250 PPS at a voltage of 2.7 V. When ready for shooting, the focus lens is always stopped at the scan starting point 307. AF scan is started at this scan starting point 307.

Next, a description will be given of an AF sequence when the focus lens is in a shooting zone.

Figure 11:
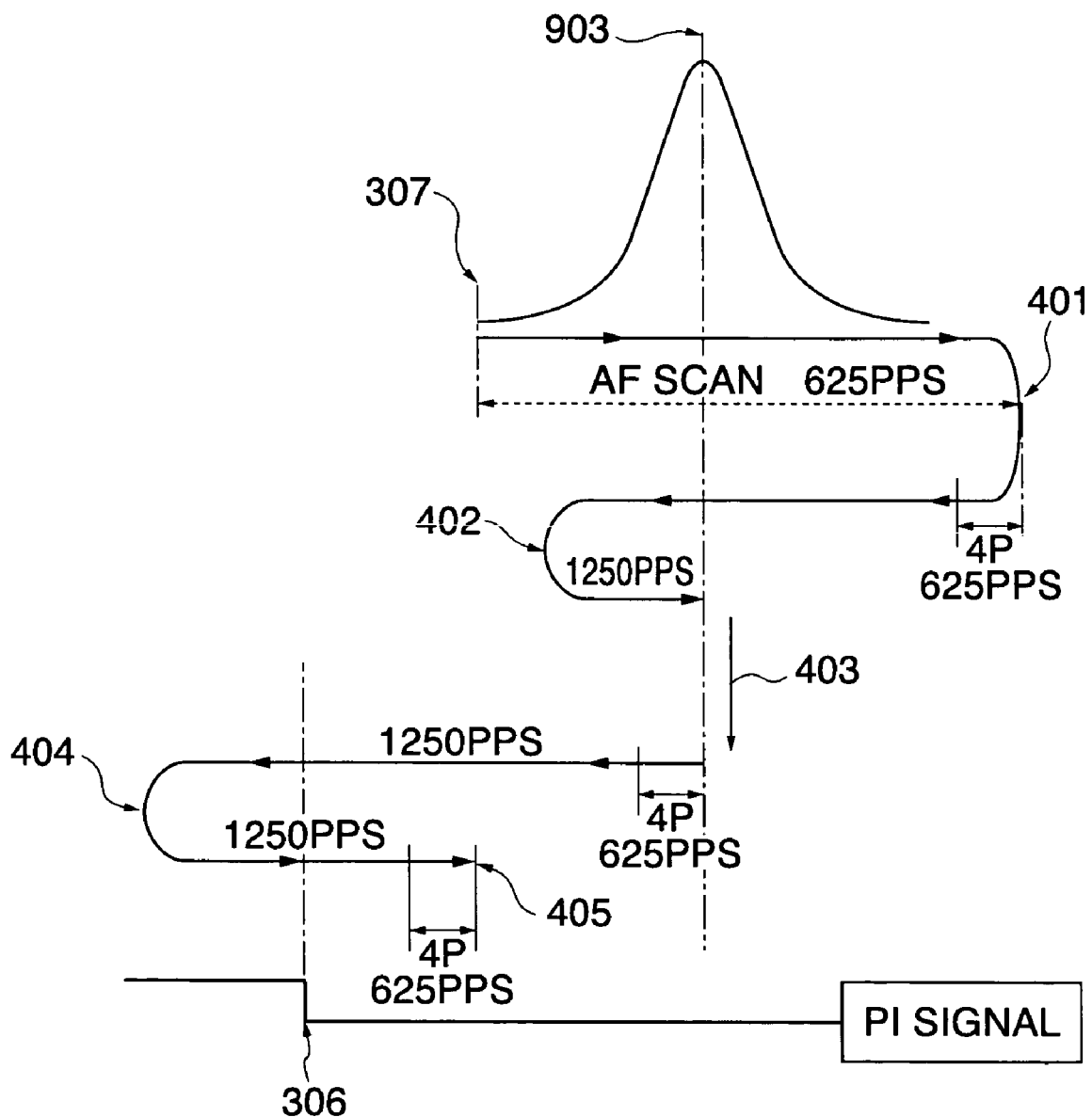
FIG. 11 is a sequence diagram showing an AF sequence carried out when the focus lens is in a shooting zone.
Figure 12:
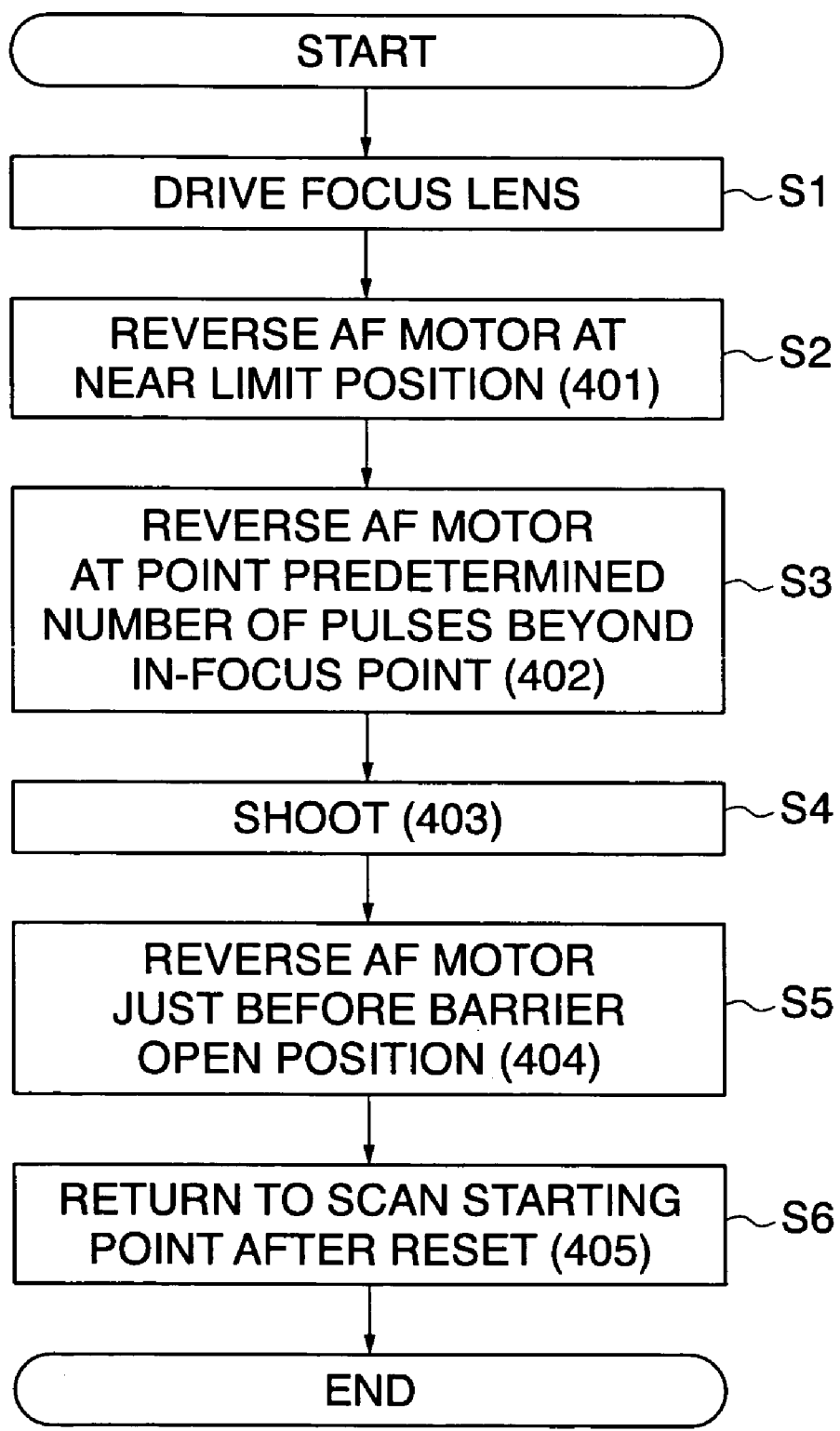
FIG. 12 is a flowchart showing the AF sequence in FIG. 11.

FIG. 11 is a diagram showing an AF sequence when the focus lens is in the shooting zone. FIG. 12 is a flowchart showing the AF sequence in FIG. 11.

In FIGS. 11 and 12, AF scan is started at the scan starting point 307. During AF scan, the focus lens is driven at the low speed of 625 PPS (step S1). The AF scan is carried out using the mountain-climbing method, in which while the focus lens is moved, high-frequency components of an image at each position of the focus lens are scanned or read, the amount of the high-frequency components is sampled as a focus evaluation value, and a peak thereof is determined. To this end, the focus lens is moved from the scan starting point 307 to the near limit position 310, or, if not in macro mode, to a predetermined position immediately preceding the position 310, while image sampling is carried out. Therefore, the focus lens must be moved at a low speed.

Thereafter, the AF motor 114 is reversed at the near limit position 310 (as indicated by reference numeral 401 in FIG. 11) (step S2), and a position 903 corresponding to the peak is taken as the in-focus point and the focus lens is moved toward that position.

First, after the reversal, the AF motor 114 is driven at 625 PPS by 4 pulses and then accelerated to 1250 PPS, to bring the focus lens to a point a predetermined number of pulses beyond the in-focus point 903, and reversed (402) (step S3). At this time, the AF motor 114 is decelerated to 625 PPS by 4 pulses before the reversal and then stopped, and after the reversal, the AF motor 114 is again driven at 625 PPS by 4 pulses, accelerated to 1250 PPS, decelerated to 625 PPS by 4 pulses, and stopped when the focus lens is moved to the in-focus point 903.

Thereafter, the shutter is operated to take a photograph (403) (step S4). After photography is finished and the release button is released, the AF reset position 306 operation is started. The AF motor 114 is driven in the retraction direction at 625 PPS by 4 pulses and then at 1250 PPS, until the focus lens passes the AF reset position 306. Just before the barrier open position 305, the AF motor 114 is reversed (404) (step S5), driven in the extension direction and, after being reset, the focus lens is returned to the scan stating point 307 (405) (step S6).

Thus, in the shooting zone described above with reference to FIG. 11, compared to the drive frequencies at start-up (the maximum 1667 PPS in FIG. 8, the maximum 1333 PPS in FIG. 9), the focus lens is driven at a lower speed at a lower drive frequency (the maximum 1250 PPS), and therefore there is little risk that the AF motor 114 will undergo a loss of synchronism. Moreover, after reaching the scan starting point 307, the focus lens does not pass through the lens barrier drive zone, and therefore the drive torque needed by the AF motor 114 is constant and low, posing little risk that the AF motor 114 will undergo a loss of synchronism. Moreover, even if the motor does get out of step, a reset is carried out, and accordingly at the next shot the lens position will be properly corrected and shooting with the lens out of position can be avoided.

As described above, according to the present embodiment, one (the PI signal switching from "L" to "H") of two positions, at which the reset signal (PI signal) is switched, is provided between a position corresponding to a phase at which the lens barrier is completely closed in the vicinity of the retracted position and the retracted position, and the other of the two positions (the PI signal switching from "H" to "L") between the lens barrier fully open position and the scan starting point, that is, reset positions, are provided at both ends of a zone in which changes in the load are large (i.e., opening and closing of the lens barrier is carried out). As a result, even if the stepping motor gets out of step due to load fluctuations and the lens gets out of position, a reset is carried out promptly so that the lens can be returned to its proper position. Further, after resetting, autofocus can be carried out without the focus lens passing through the zone of large load changes.

Moreover, during start-up in a state in which the focus lens is retracted into the body of the camera, the spring force of the lens barrier lightens the load on the lens, thereby permitting the pulse rate of the stepping motor to be increased beyond the normal speed for acceleration and thus speeding up the rate at which the lens is extended from the body of the camera. This can reduce the start-up time required from the time the power is turned on with the focus lens in the retracted position to the time shooting can be started. Moreover, conversely, in the lens barrier drive zone during lens retraction, the load on the lens increases due to tensioning of the lens barrier spring and thus the stepping motor pulse rate is reduced for acceleration. As a result, the drive torque is increased and loss of synchronism can be prevented.

Further, the pulse rate of the stepping motor in the lens barrier drive zone is changed depending on the remaining battery capacity, and therefore, for example when the remaining battery capacity is sufficient, it is possible to increase the pulse rate and thus increase the speed at which the image pickup lens is extended, and hence shorten the start-up time. Moreover, even when the remaining battery capacity is insufficient, it is possible to decrease the pulse rate and drive the image pickup lens at low speed, thus putting the apparatus into a state in which shooting is enabled, and to continue to photograph until the remaining battery capacity is almost fully depleted.

It is to be understood that the objects of the present invention may also be accomplished by supplying a system or an apparatus with a storage medium (or a recording medium) in which a software program code which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Examples of the storage medium for supplying the program code include a floppy (registered trademark) disk, a hard disk, an optical disk (registered trademark), a magnetic-optical disk, a CD-ROM, a MO, a CD-R, a CD-RW, a DVD-ROM, a DVD-RAM, a DVD-RW, a DVD+RW, a magnetic tape, a nonvolatile memory card, a ROM, and an EEPROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2003-318913 filed Sep. 10, 2003, which is hereby incorporated by reference herein.

What is claimed is:
1. An image pickup apparatus comprising:
a body;
an image taking lens retractable into said body of the image pickup apparatus;
a driving ring configured to rotate to cause said image taking lens to move on an optical axis, said driving ring having a flange member;
a lens barrier configured and positioned to protect said image taking lens;
a lens barrel disposed so as to open said lens barrier while said image taking lens moves from a retracted position thereof to a shooting zone, and to close said lens barrier while said image taking lens moves from the shooting zone to the retracted position, while being rotated by a stepping motor;

a detecting device that detects said flange member to determine whether or not said image taking lens is positioned at one of a first reference position of said lens barrel and a second reference position of said lens barrel, wherein during a closing operation of said lens barrier, the first reference position is arranged so as to correspond to a position of said lens barrier in a fully closed state, and the second reference position is arranged so as to correspond to a position of said lens barrier in a fully opened state during an opening operation of said lens barrier; and a position control device that controls a position of said lens barrel by resetting pulse counts of the stepping motor when said detecting device detects that said image taking lens is positioned at one of the first reference position and the second reference position.

2. An image pickup apparatus according to claim 1, wherein the first reference position is provided at a first section between a lens barrier open position at which said lens barrier is fully open and the shooting zone, and the second reference position is provided at a second section between a lens barrier closed position at which said lens barrier is fully closed and the retracted position.

3. An image pickup apparatus according to claim 1, wherein:

said image taking lens is disposed to be moved by said stepping motor; and said position control device decreases a pulse rate of said stepping motor to decelerate said drive device when said lens barrier is driven to close, and increases the pulse rate of said stepping motor to accelerate said stepping motor when said lens barrier is driven to open.

4. An image pickup apparatus according to claim 3, comprising a voltage detecting device that detects a voltage of a battery, and wherein:

said stepping motor is disposed to be operated by battery power; and said position control device changes the pulse rate of said stepping motor when said lens barrier is driven to open, according to results of detection by said voltage detecting device.

5. A control method of controlling a lens barrel position of a lens barrel of an image pickup apparatus comprising an image taking lens retractable into a body of the image pickup apparatus, a driving ring configured to rotate to cause the image taking lens to move on an optical axis, the driving ring having a flange member, a lens barrier configured and positioned to protect the image taking lens, and a lens barrel disposed so as to open said lens barrier while the image taking lens moves from a retracted position thereof to a shooting zone and to close the lens barrier while the image taking lens moves from the shooting zone, to the retracted position, while being rotated by a stepping motor, the control method comprising:

a detecting step of detecting the flange member to determine whether or not the image taking lens is positioned at one of a first reference position of the lens barrel and a second reference position of the lens barrel, wherein during a closing operation of said lens barrier the first reference position is arranged so as to correspond to a position of the lens barrier in a fully closed state and the second reference position is arranged so as to correspond to a position of the lens barrier in a fully opened state during an opening operation of the lens barrier; and a position control step of controlling a position of the lens barrel by resetting pulse counts of the stepping motor when said detecting step detects that said image taking lens is positioned at one of the first reference position and the second reference position.

6. A computer-readable control program stored in a non-transitory computer-readable storage medium for executing a control method of controlling a lens barrel position of a lens barrel of an image pickup apparatus comprising an image taking lens retractable into a body of the image pickup apparatus, a driving ring configured to rotate to cause the image taking lens to move on an optical axis, the driving ring having a flange member, a lens barrier configured and positioned to protect the image taking lens, and a lens barrel disposed so as to open said lens barrier while the image taking lens moves from a retracted position thereof to a shooting zone, and to close the lens barrier while the image taking lens moves from the shooting zone to the retracted position, while being rotated by a stepping motor, the control method comprising:

a detecting step of detecting the flange member to determine whether or not the image taking lens is positioned at one of a first reference position of the lens barrel and a second reference position of the lens barrel, wherein during a closing operation of said lens barrier, the first reference position is arranged so as to correspond to a position of the lens barrier in a fully closed state and the second reference position is arranged so as to correspond to a position of the lens barrier in a fully opened state during an opening operation of the lens barrier; and a position control step of controlling a position of the lens barrel by resetting pulse counts of the stepping motor when said detecting step detects that said image taking lens is positioned at one of the first reference position and the second reference position.

* * * * *